(12) United States Patent
Feldman et al.

(10) Patent No.: US 9,612,825 B2
(45) Date of Patent: Apr. 4, 2017

(54) SYSTEMS AND METHODS FOR MERGING METADATA-BASED APPLICATIONS

(71) Applicant: Cherwell Software, LLC, Colorado Springs, CO (US)

(72) Inventors: Arlen Sander Feldman, Colorado Springs, CO (US); Vance Franklin Brown, Colorado Springs, CO (US)

(73) Assignee: Wells Fargo Bank, National Association, As Agent, Santa Monica, CA (US)

(*) Notice: Subject to any disclaimer, the term of this patent is extended or adjusted under 35 U.S.C. 154(b) by 0 days.

(21) Appl. No.: 14/213,994

(22) Filed: Mar. 14, 2014

(65) Prior Publication Data

US 2014/0282466 A1    Sep. 18, 2014

Related U.S. Application Data

(60) Provisional application No. 61/792,781, filed on Mar. 15, 2013.

(51) Int. Cl.
*G06F 9/44* (2006.01)
*G06F 17/30* (2006.01)

(52) U.S. Cl.
CPC .......... *G06F 8/71* (2013.01); *G06F 17/30595* (2013.01)

(58) Field of Classification Search
CPC ................................................ G06F 17/30595
USPC ........................................................ 717/168
See application file for complete search history.

(56) References Cited

U.S. PATENT DOCUMENTS

| 6,256,773 | B1* | 7/2001 | Bowman-Amuah | 717/121 |
| 7,203,938 | B2* | 4/2007 | Ambrose et al. | 717/170 |
| 7,721,158 | B2* | 5/2010 | Lee | 714/48 |
| 8,434,066 | B2* | 4/2013 | Sharma | 717/126 |
| 2002/0104069 | A1* | 8/2002 | Gouge et al. | 717/107 |
| 2008/0256512 | A1* | 10/2008 | Meijer et al. | 717/110 |
| 2012/0296862 | A1* | 11/2012 | Duda et al. | 707/602 |
| 2014/0304694 | A1* | 10/2014 | Huff et al. | 717/168 |

OTHER PUBLICATIONS

"Method for Metadata Repository Tagging and Intelligent Tag Generation"; an IP.com Prior Art Database Technical Disclosure; Jul. 13, 2009.*
"Digital Signature"; Wikipedia.org website; Mar. 13, 2012.*

* cited by examiner

*Primary Examiner* — Qing Chen
*Assistant Examiner* — Clint Thatcher
(74) *Attorney, Agent, or Firm* — Eversheds Sutherland (US) LLP (57) ABSTRACT

Systems and methods for mergeable metadata-based applications may be provided. According to some embodiments, a method may include determining, by a computer including one or more processors, one or more changes to be made to an application on a target computer. The method may also include identifying metadata associated with the application, the metadata corresponding to the one or more changes to be made. Furthermore, the method may include generating at least one tag associated with the metadata. The at least one tag may include information that describes one or more database definitions included in the metadata. Additionally, the method may include wrapping the at least one tag and the metadata into a mergeable metadata application and transmitting, to the target computer, the mergeable metadata application.

20 Claims, 5 Drawing Sheets

SYSTEMS AND METHODS FOR MERGING METADATA-BASED APPLICATIONS

CROSS REFERENCE TO RELATED APPLICATION

This application claims the benefit of U.S. Provisional Application No. 61/792,781, filed Mar. 15, 2013, the contents of which are incorporated by reference.

FIELD OF THE DISCLOSURE

Embodiments of this disclosure relate generally to systems and methods for merging metadata-based applications.

BACKGROUND OF THE DISCLOSURE

Certain business software may be built around a premise of presenting data from a relational database to users. The relational database may allow editing of such data while enforcing various rules such as validation, etc., and also enabling automation and/or reporting based on the data. Additionally, certain systems may be written by software developers who first model the data in a relational database management system (RDBMS), then build business logic and a user interface in a high-level programming language (e.g., C++, C#, JavaScript, etc.). In order to modify such a system, the developer may use tools to modify a schema of the database. After schema modification, the developer may then modify business logic and user interface (referred to herein as "UI") code to appropriately reflect these changes. With conventional applications, combined functionality from multiple different systems may prove challenging. In certain cases, custom code may be written, or middleware and/or custom front-ends may be employed to create an appearance of integration between systems. Other techniques may involve storing data descriptions, business logic, and UI definitions in metadata, which may describe the operation of the system. This metadata may be definitions stored in the RDBMS (schema, constraints, etc.) or may be stored in other formats, such as XML. To this end, changing the metadata may enable changes to the behavior and/or operation of the application (e.g., via graphical user interface (GUI) tools) to be made.

This metadata approach may allow for extension of the system by non-programmers, and in certain implementations, the metadata definitions may be extended to handle new business constructs and concepts beyond the original scope of the system. Thus, each instance of the software application, which may include the same underlying object code, can appear and behave differently depending on its respective metadata definitions. However, it may be difficult to use new definitions to describe new functionality and make it operate appropriately with changed definitions for each different instance. For example, since new functionality may interoperate with existing definitions, the new functionality may be unable to rely on any common properties to be present or to be named consistently. Furthermore, in situations where the modifications may directly modify existing functionality, integration may prove increasingly challenging. In some cases, an expert may manually reconcile changes to the system by building the same changes from scratch into the target system. Such an individual may manually update definitions, rules and user interface. However, such an approach may be costly in terms of time and effort.

SUMMARY OF THE DISCLOSURE

The present disclosure can provide systems and methods for merging metadata-based applications. In certain embodiments, systems and methods can facilitate modification and extension of business software used for tracking and acting upon relational data.

According to one or more example embodiments, in order to implement the broad concepts described above, a method is provided. The method may include determining, by a computer including one or more processors, one or more changes to be made to an application on a target computer. The method may also include identifying metadata associated with the application, the metadata corresponding to the one or more changes to be made. Furthermore, the method may include generating at least one tag associated with the metadata. The at least one tag may include information that describes one or more database definitions included in the metadata. Additionally, the method may include wrapping the at least one tag and the metadata into a mergeable metadata application and transmitting, to the target computer, the mergeable metadata application.

According to one or more example embodiments, another method is provided. The method may include receiving, by a target computer that includes one or more processors, a mergeable metadata application. In addition, the target computer may be executing a target application. The method may also include extracting metadata and at least one tag from the mergeable metadata application. The at least one tag may include description information that describes one or more database definitions included in the metadata. Furthermore, the method may include identifying, based at least in part on the description information and one or more operating requirements associated with the target application, one or more conflicts between the mergeable metadata application and the target application. The method may also include determining, based at least in part on the one or more conflicts, one or more conflict resolution changes to be made to the target application.

According to yet other example embodiments, a target computer is provided. The target computer may include at least one memory for storing data and computer-executable instructions. Additionally, the target computer may also include at least one processor to access the at least one memory and to execute the computer-executable instructions. Furthermore, the at least one processor may be configured to execute the instructions to execute a target application and receive a mergeable metadata application. Additionally, the at least one processor may execute the instructions to extract metadata and at least one tag from the mergeable metadata application. The at least one tag may include description information that describes one or more database definitions included in the metadata. The at least one processor may also execute the instructions to identify, based at least in part on the description information and one or more operating conditions associated with the target application, one or more conflicts between the mergeable metadata application and the target application. Moreover, the at least one processor may also execute the instructions to determine, based at least in part on the one or more conflicts, one or more conflict resolution changes to be made to the target application.

BRIEF DESCRIPTION OF THE DRAWINGS

Reference will now be made to the accompanying drawings, which are not necessarily drawn to scale, and wherein.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Embodiments of the disclosure may include systems and methods for merging metadata-based applications, or facilitating the merging of metadata-based software applications. Certain embodiments of the disclosure may enable automated processes for merging potentially conflicting applications. The processes may also identify decision points that cannot be automated and present these decision points to the user, who can then resolve conflicts to complete the process.

Figure 1:
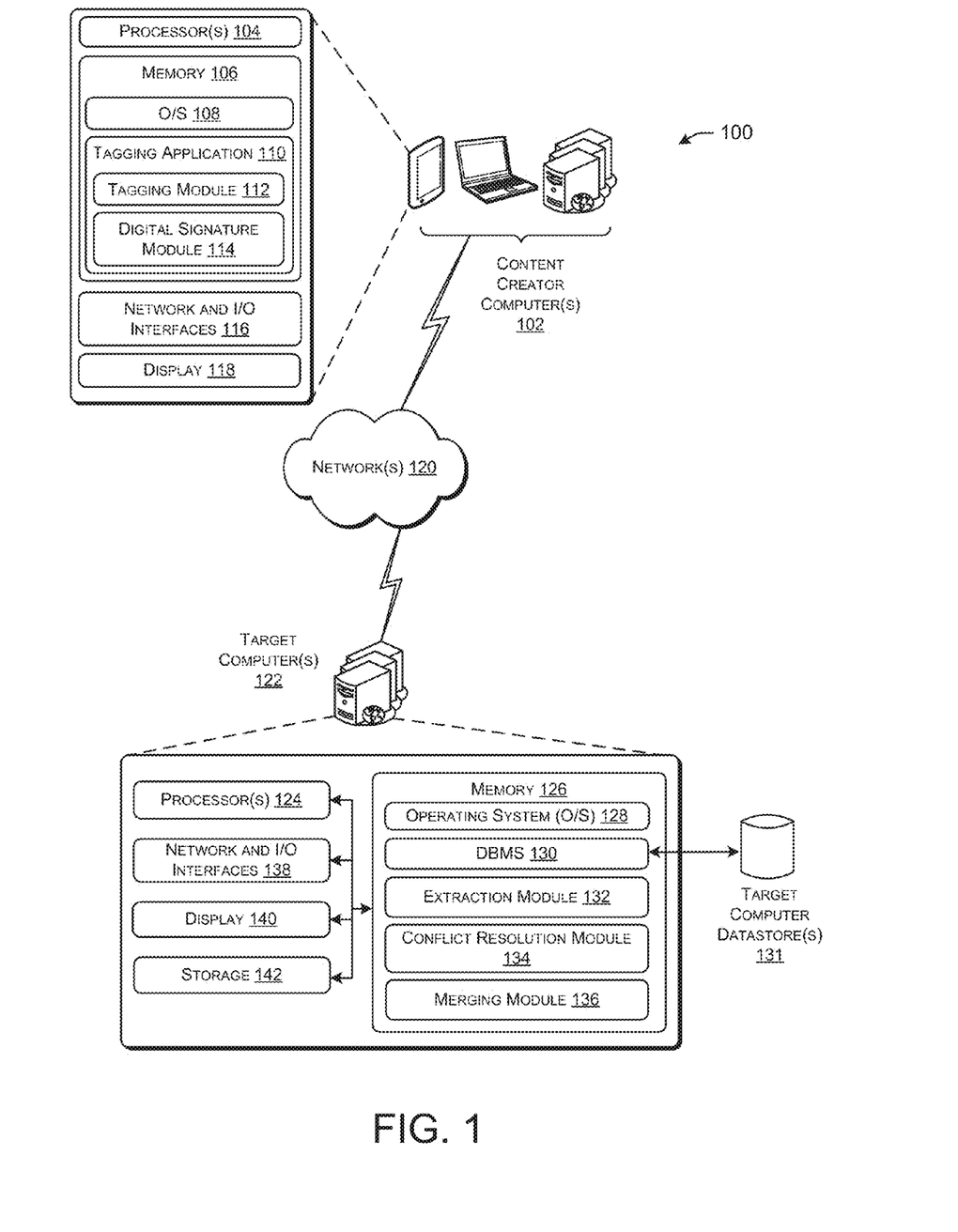
FIG. 1 is a block diagram of a system for merging metadata-based application according to one or more example embodiments of the disclosure.

With reference now to FIG. 1, a system 100 for merging metadata-based applications is shown according to one or more embodiments of the disclosure. The system 100 may include one or more content creator computer(s) 102. In general, the content creator computer 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The content creator computer(s) 102 may include one or more computer processors 104, a memory 106 (which stores an operating system 108 and a tagging application 110 including a tagging module 112 and a digital signature module 114), network and I/O interfaces 116, and a display 118. In certain embodiments, the content creator computer(s) 102 may include one or more sensors capable of gathering information associated with a present environment of the content creator computer(s) 102, or similar hardware devices, such as a camera, microphone, antenna, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The content creator computer 102 may also include a chipset (not shown) for controlling communications between the one or more processors 104 and one or more of the other components of the content creator computer 102. In certain embodiments, the content creator computer 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may comprise one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the content creator computer 102. The operating system 108 may include any operating system now known or which may be developed in the future including, but not limited to, any server operating system, any mainframe operating system, or any other proprietary or freely available operating system. The memory 106 may also store content that may be displayed by the content creator computer 102 or transferred to other devices (e.g., headphones) to be displayed or played by the other devices. The memory 106 may also store content received from the other devices. The content from the other devices may be displayed, played, or used by the content creator computer 102 to perform any necessary tasks or operations that may be implemented by the computer processor or other components in the content creator computer 102.

Furthermore, the memory 106 may store a tagging application 110 to facilitate navigation and/or access of various resources on the Internet, such as one or more web pages served by a target computer(s) 122 of a service provider. In certain embodiments, the tagging application 110 may enable a user of the content creator computer 102 to access a product details web page served by the target computer(s) 122. As described in more detail below, the product details page may include information regarding a focus product that the user may be interested in.

The network and I/O interfaces 116 may also comprise one or more communication interfaces or network interface devices to provide for the transfer of data between the content creator computer 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The content creator computer 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the content creator computer 102 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 118 may include, but is not limited to, a liquid crystal display, a light-emitting diode display, an E-Ink™ display as made by E Ink Corp. of Cambridge, Mass., or any other similar type of output device. The display 118 may be used to show content to a user in the form of text, images, or video. In certain instances, the display 118 may also operate as a touch screen display that may enable the user to initiate commands or operations by touching the screen using certain finger or hand gestures.

According to one or more embodiments, the content creator computer 102 may be in communication, via one or more networks 120, with one or more target computer(s) 122. As used herein, unless otherwise specified, the term "computer" may refer to any computing device having a networked connectivity and configured to provide one or more dedicated services to users.

As such, the target computer(s) 122 may include one or more processors 124 and a memory 126. As such, the memory 126 may store an operating system 128, a database management system (DBMS) 130, an extraction module 132, a conflict resolution module 134, and a merging module 136. In addition, the target computer(s) 122 may also include network and I/O interfaces 138, a display 140, and storage 142. While any of the above mentioned components in the content creator computer 102 and the target computer(s) 122 may hereinafter be referred to in the singular, it will be appreciated that any future references to these components also contemplate them in a plurality.

The processors 124 may comprise one or more cores and may be configured to access and execute (at least in part) computer-readable instructions stored in the memory 126. The one or more computer processors 124 may include, without limitation (and similar to the processors 104 in the content creator computer 102): a CPU, DSP, RISC, CISC, a microprocessor, a microcontroller, a field programmable gate array (FPGA), or any combination thereof. The target computer 122 may also include a chipset (not shown) for controlling communications between the one or more processors 124 and one or more of the other components of the target computer 122. In certain embodiments, the target computer 122 may be based on an Intel® architecture or an ARM® architecture, and the processor(s) and chipset may be from a family of Intel® processors and chipsets. The one or more processors 124 may also include one or more application-specific integrated circuits (ASICs) or application-specific standard products (ASSPs) for handling specific data processing functions or tasks.

The memory 126 may comprise one or more computer-readable storage media (CRSM). Similar to the memory 106 in the content creator computer 102, the memory 126 may include non-transitory media such as RAM, flash RAM, magnetic media, optical media, solid state media, and so forth. The memory 126 may be volatile or non-volatile and may also be provided as a computer program product including a transitory machine-readable signal (in compressed or uncompressed form). Additionally, the memory 126 may store an operating system 128 that includes a plurality of computer-executable instructions that may be implemented by the computer processor to perform a variety of tasks to operate the interface(s) and any other hardware installed on the target computer 122. The operating system 128 may include any operating system now known or which may be developed in the future including, but not limited to, any server operating system, any mainframe operating system, or any other proprietary or freely available operating system.

It should be appreciated that any data and/or computer-executable instructions stored in the memory 126 may be additionally, or alternatively, stored in the data storage 142 and/or in one or more other datastores. The DBMS 130 depicted as being loaded into the memory 126 may support functionality for accessing, retrieving, storing, and/or manipulating data stored in external datastore(s) (e.g., the target computer datastore(s) 131), data stored in the memory 126, and/or data stored in the data storage 142. For example, the DBMS 130 may be configured to retrieve user account data (e.g., information related to status information of a package) from the target computer datastore(s) 131 responsive to receipt of the request from the target computer 122. In addition, the DBMS 130 may be configured to retrieve information about operating conditions (e.g., operating requirements such as database definitions, database objects, object types, object attributes, and/or other conditions/requirements) associated with one or more target applications executing on the target computer 122. The DBMS 130 may use any of a variety of database models (e.g., relational model, object model, etc.) and may support any of a variety of query languages.

The network and I/O interfaces 138 may also comprise one or more communication interfaces or network interface devices to provide for the transfer of data between the target computer 122 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. As such, the target computer 122 may be coupled to the network via a wired connection and/or a wireless connection. The communication interfaces may utilize acoustic, radio frequency, optical, or other signals to exchange data between the target computer 122 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 140 may include, but is not limited to, a liquid crystal display, a light-emitting diode display, an E-Ink™ display as made by E Ink Corp. of Cambridge, Mass., or any other similar type of output device. The display 140 may be used to show content to a user in the form of text, images, or video. In certain instances, the display 140 may also operate as a touch screen display that may enable the user to initiate commands or operations by touching the screen using certain finger or hand gestures.

The target computer 122 may further comprise storage 142, such as removable storage and/or non-removable storage including, but not limited to, magnetic storage, optical disk storage, and/or tape storage. Storage 142 may provide non-transient storage of computer-executable instructions and other data. The storage 142 may include storage that is internal and/or external to the user target computer 122.

As previously mentioned, the memory 126 may store an extraction module 132, a conflict resolution module 134, and a merging module 136.

It will be appreciated that while FIG. 1 illustrates various modules as being included within the target computer 122, in other embodiments, such modules may be included, executed, and/or otherwise implemented by other devices in any combination. For example, in certain implementations, the extraction module 132 may be included in a separate device, such as an extracting computer, and may be in communication with the content creator computer 102, the target computer 122, and the various other modules, via the network 120. Furthermore any of the modules included within the target computer 122 may include its own processing capabilities and/or may share processing capabilities across other modules in any combination.

Broadly, the content creator computer 102 may include functionality for generating mergeable metadata applications utilizing tags. The tags may be configured to indicate connection points associated with various software applications. In addition, the tags may include description information that describes one or more database definitions included in metadata associated with an application. While the content creator computer 102 and the target computer 122 are shown as separate systems, it is to be understood that this diagram is illustrative only; many other configurations can be implemented. For example, the content creator computer 102 and the target computer 122 can be different parts of an integrated system and therefore located on the same site, such as in a LAN or WAN environment, or even accessed from the same computer.

It will be appreciated that the content creator computer 102 may be utilized by a creator of a mergeable metadata application, and that target computer 122 can import or otherwise receive the mergeable metadata application from the content creator computer 102. In this respect, the target computer 122 can represent the target system into which the mergeable metadata application is integrated and also possibly the system on which conflicts may arise between the target system and the mergeable metadata application. For example, a content creator computer 102 may be used by a software developer for a target application. The target computer 122 may be used by a user to execute the target application. In certain implementations, the software developer may decide to make certain changes (e.g., additional features, fixes, and/or other functionality, such as by request of the user of the target computer 122) to the target application. Such changes may be stored in and/or otherwise associated with a mergeable metadata application created by the software developer on the content creator computer 102. The content creator computer 102 may be configured to transmit the mergeable metadata application to the target computer 122. The target computer 122 may be configured to receive the mergeable metadata application and identify one or more changes indicated by the mergeable metadata application. As such, the target computer 122 may be configured to merge the identified changes with the target application, thereby enabling the execution of new and/or otherwise modified functionality added to the target application.

According to one or more embodiments, in order to perform the operations broadly described above, the content creator computer 102 may include a tagging application 110. The tagging application 110 may include a tagging module 112 and a digital signature module 114. The tagging module 112 may be configured to determine one or more changes that are to be made to a target application, which may be executed on a target computer 122. Such changes may be reflected in all and/or a portion of the metadata associated with the target application. To this end, the tagging module 112 may be configured to generate at least one tag associated with the metadata. The at least one tag may include description information that describes one or more attributes of the metadata.

According to certain implementations, the description information may identify the target application. The description information may also describe one or more database definitions included in the metadata and to be used by the target application. For example, the description information may include data related to database rules, fields, objects, object types, object length, and/or any other type of information associated with database definitions. Furthermore, the description information may also describe one or more dependencies between different database objects associated with the metadata and used by the target application (e.g., parent/child relationships and/or the like). To this end, the tagging module 112 may be configured to determine whether certain dependencies may be included in the description information and whether other dependencies may be left out of the description information.

In some embodiments, a user of the content creator computer 102 (e.g., a software developer and/or any other type of content creator) may manually use the tagging application 110 to tag metadata. In other embodiments, the tagging application 110 may be configured to automatically tag at least a portion of the metadata associated with the target application.

Upon tagging the metadata, the tagging module 112 may be configured to wrap the tag(s) and the metadata into a mergeable metadata application. The mergeable metadata application may be constructed such that additions to and/or differences between itself and the target application may be readily identified, and such additions and/or differences may be seamlessly merged with the target application on the target computer 122. To this end, the mergeable metadata application may include fully realized database objects in addition to the generated tags to provide information for matching database constructs with those in the target application. In other embodiments, the mergeable metadata application may instead include database object stubs, which may include less information than a fully realized database object but may still provide information for matching database constructs.

Furthermore, the digital signature module 114 may be configured to apply, attach, and/or otherwise associate a digital signature to the mergeable metadata application. The digital signature may provide a way to identify the changes included in the metadata (e.g., the database definitions, etc.)

as belonging to the mergeable metadata application. In other words, the digital signature may identify the mergeable metadata application as the source of the changes.

Once the tagging application 110 has completed the creation/generation of the mergeable metadata application, the tagging application 110 may be configured to prepare the mergeable metadata application for transmission to the target computer 122. In some implementations, preparing the mergeable data application for transmission may include serializing the mergeable metadata application into a transport format. For example, the mergeable metadata application may be serialized into Extensible Markup Language (XML), though it will be appreciated that any other type of transport format and/or file format is also contemplated. Upon completing the preparation, the mergeable metadata application may be transmitted to the target computer 122.

According to one or more embodiments, the target computer 122 may be configured to receive the transmitted mergeable metadata application. Upon receipt, the extraction module 132 may be configured to extract metadata and at least one tag associated with the metadata from the mergeable metadata application. The extraction module 132 may also be configured to compare the description information associated with the at least one tag with one or more operating conditions associated with the target application. For example, the extraction module 132 may compare the database definitions described by the at least one tag with current database definitions used and/or relied upon by the target application. As such, the extraction module 132 may determine that the mergeable metadata application adds, modifies, and/or removes features (e.g., database definitions) from the target application. For instance, in some implementations, the extraction module 132 may compare each component of the mergeable metadata application and identify whether the component is new to the target application, already fully exists in the target application, and/or already partially exists in the target application.

Furthermore, the extraction module 132 may be configured to identify any conflicts between the mergeable metadata application and the target application. For instance, the at least one tag may describe one or more database definitions in the mergeable metadata application that may not exist in the target application. Additionally, the at least one tag may describe modifications to one or more database definitions in the target application. Further still, the at least one tag may describe one or more changes to a user interface associated with the target application.

Upon identifying conflicts between the mergeable metadata application and the target application, the extraction module 132 may transmit and/or otherwise provide the conflicts to the conflict resolution module 134. In certain embodiments, the conflict resolution module 134 may be configured to automatically determine one or more conflict resolution changes to resolve the conflicts. For instance, if a conflict includes a missing data type that is referred to by the mergeable metadata application but that remains undefined by the target application, the conflict resolution module 134 may be configured to define the missing data type using the metadata extracted from the mergeable metadata application. In other embodiments, the conflict resolution module 134 may be configured to present one or more of the conflicts to a user of the target computer 122, such as via the display 140. To this end, the conflict resolution module 134 may be configured to receive user instructions for one or more conflict resolution changes to resolve the conflicts.

Upon identifying the conflict resolution changes to be made to the target application, the conflict resolution module 134 may be configured to provide the changes to the merging module 136. The merging module 136 may be configured to merge the identified conflict resolution changes with the target application. In addition, the merging module 136 may be configured to merge any other changes, described by the at least one tag of the mergeable metadata application, with the target application. Such changes may include changes to database definitions (e.g., adding, removing, and/or modifying thereof) as well as changes to a user interface corresponding to the changes in the database definitions of the target application.

According to some embodiments, the target application may be modified by merging changes from multiple mergeable metadata application. To this end, the target computer 122 may wish to determine which changes belong to which mergeable metadata application. As such, the target computer 122 may be configured to identify and/or otherwise determine a digital signature associated with a particular change. Based on the digital signature, the target computer 122 may be able to determine the source mergeable metadata application that originally effected the change.

As a result of certain embodiments described above, the system 100 may allow for the wrapping of metadata and/or portions of metadata along with detailed information related to connection points associated with different target applications. Connection points may include, but are not limited to memory usage, processor requirements, bus requirements, and other components included in the target computer 122 that may provide resources to multiple target applications. As a result, the wrapped portions of the metadata and connection points may be transported to a target computer 122, compared with the operating conditions of the target computer 122 and/or the target application(s), and merged with the target computer 122 and/or the target application during a reconciliation process.

For example, consider a metadata driven incident management application (e.g., a target application) executing on a management system (e.g., a target computer 122) that does not currently have support for bill-back functionality (e.g., charging customers or departments for work completed). A content developer could create a bill-back functionality (e.g., via the content creator computer 102) for the incident management application. The creation of the bill-back functionality may entail not only creating new objects (line items, invoices, etc.), but also adding new fields to existing objects in the incident management application. The existing objects may include components such as the main incident object, tasks, etc., to hold information relevant to billing, and adding relationships between the old and new objects. Additionally, the content developer may also modify metadata that describes a user interface in order to allow for appropriate entry of bill-back related data in the incident management application. Such changes to the incident management system may be tagged and wrapped (by the content developer) into a mergeable metadata application. The mergeable metadata application may be received by the management system, and the included changes may be merged seamlessly into the management system without manually rebuilding existing functionality and the new functionality from scratch (e.g., recoding database definitions, user interfaces, and/or the like).

Figure 2:
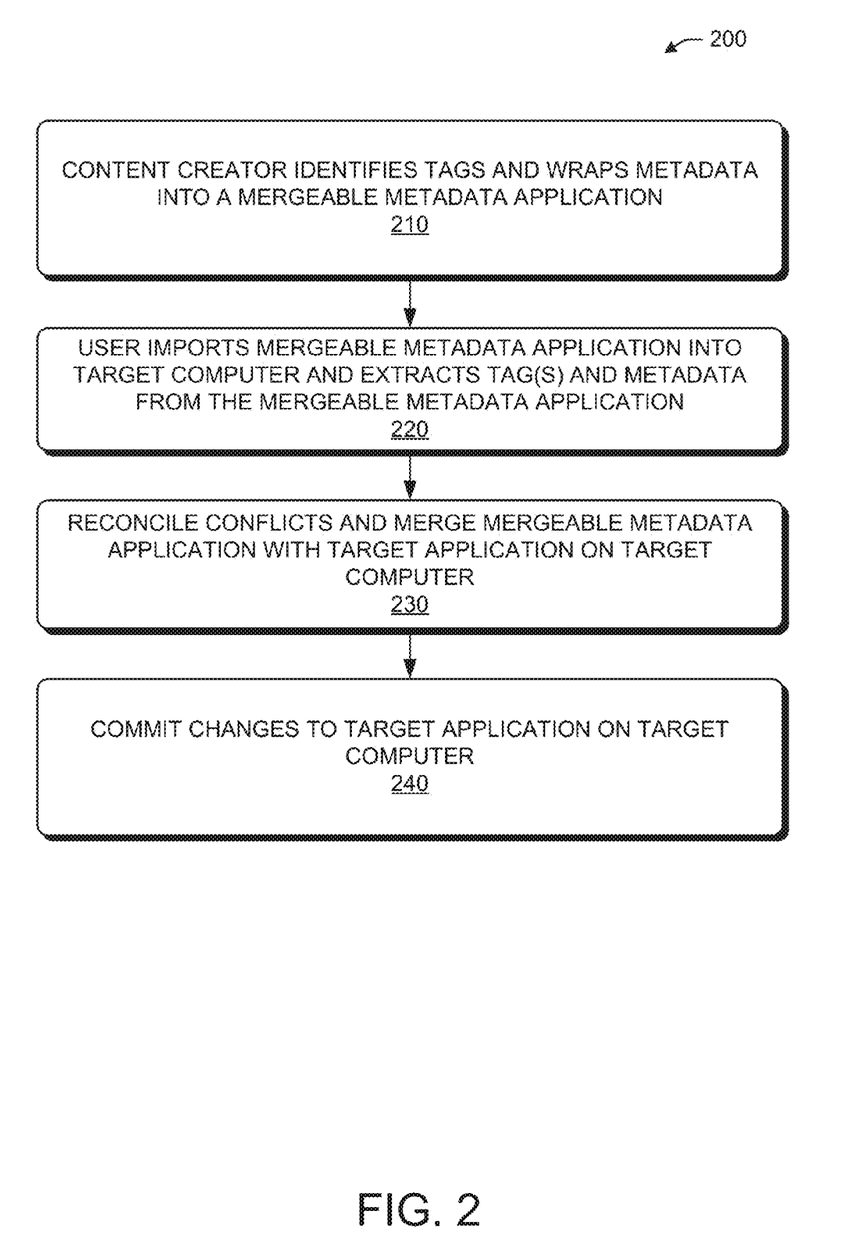
FIG. 2 is a flow diagram illustrating a method for mergeable metadata-based application applications according to one or more example embodiments of the disclosure.

Turning now to FIG. 2, a method 200 for mergeable metadata-based applications is provided in accordance with one or more example embodiments. The method 200 may broadly describe interfaces between a content creator computer (e.g., content creator computer 102) and a target computer (e.g., target computer 122). At block 210, the content creator computer 102 may identify, tag, and wrap metadata into a mergeable metadata application. In block 220, the target computer 122 (and/or a user thereof) may import the mergeable metadata application into the target computer 122 and extract the metadata and at least one tag from the mergeable metadata application. In block 230, upon detecting conflicts between the target computer 122 and the mergeable metadata application, the conflicts may be reconciled either automatically or manually. In block 240, the user of the target computer 122 may commit changes to the target computer 122.

Figure 3:
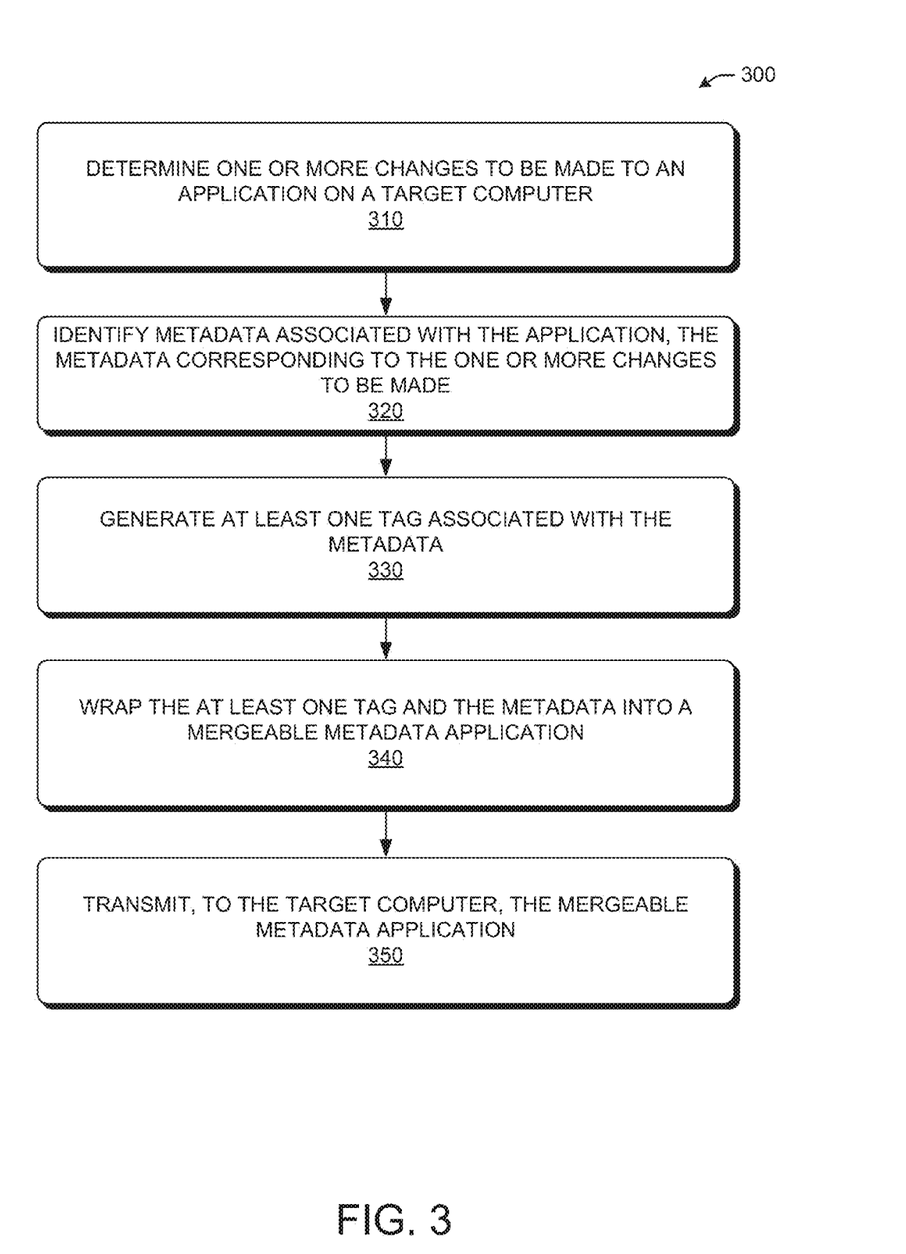
FIG. 3 is a flow diagram illustrating another method for mergeable metadata-based applications according to one or more example embodiments of the disclosure.

Turning now to FIG. 3, a method 300 for mergeable metadata-based applications is provided in accordance with one or more example embodiments. The method 300 may describe interactions and communications from the perspective of a content creator computer, such as the content creator computer 102. In block 310, a content creator computer (e.g., content creator computer 102) may determine one or more changes to be made to a target application on a target computer (e.g., target computer 122). In block 320, the content creator computer may identify metadata associated with the target application. The metadata may correspond to the one or more changes to be made to the target application. For example, a content creator (e.g., a content developer) may use a tagging tool (e.g., tagging application 110) to identify metadata that corresponds to new functionality to be added to the target application. To this end, the content creator may be able to designate which portions of the metadata correspond to functionality that is optional, valid, required by the target application, and/or the like.

In block 330, the content creator computer may generate at least one tag associated with the metadata. The at least one tag may include description information that describes one or more database definitions included in the metadata. In block 340, the content creator computer may wrap the at least one tag and the metadata into a mergeable metadata application. In block 350, the content creator computer may transmit, to the target computer, the mergeable metadata application.

Figure 4:
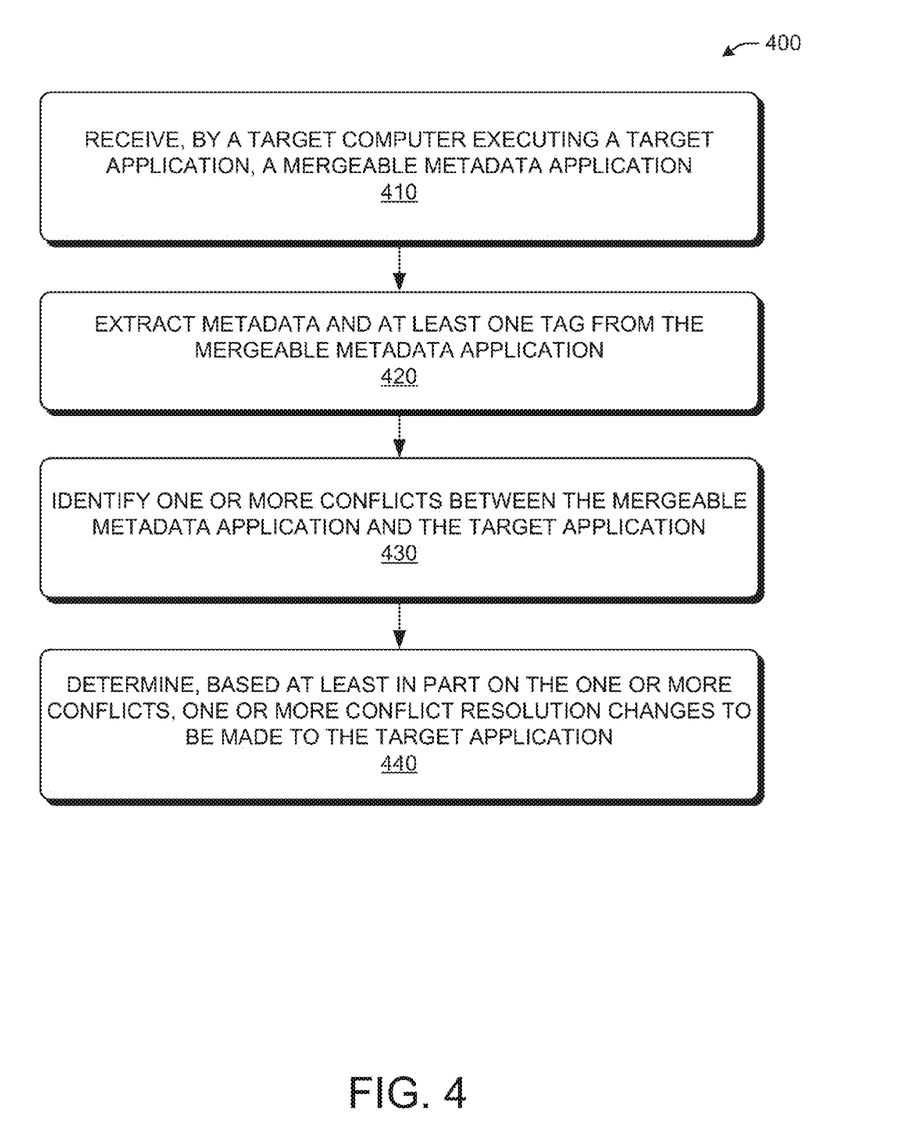
FIG. 4 is a flow diagram illustrating another method for mergeable metadata-based applications according to one or more example embodiments of the disclosure.

Turning now to FIG. 4, a method 400 for mergeable metadata-based applications is provided in accordance with one or more example embodiments. The method 400 may describe interactions and operations from the perspective of a target computer (e.g., target computer 122). In block 410, a target computer (e.g., target computer 122) may be configured to receive a mergeable metadata application. In addition, the target computer may be configured to execute a target application. In block 420, the target computer may extract metadata and at least one tag from the mergeable metadata application. The at least one tag may include description information that describes one or more database definitions included in the metadata and/or used by the target application.

In block 430, the target computer may identify one or more conflicts between the mergeable metadata application and the target application. The identification may be based at least in part on the description information and one or more operating conditions associated with the target application. In block 440, the target computer may determine, based at least in part on the one or more conflicts, one or more conflict resolution changes to be made to the target application.

As an optional feature in at least one embodiment, a conflicts library can be utilized by either or both of the content creator computer 102 and the target computer 122. The conflicts library may be organized as a relational database having data views directed to specific target systems, mergeable metadata applications, and the conflicts that arise between them. Solutions, in the form of human-readable descriptions of how to resolve conflicts, along with relevant data structures and metadata, can be stored and searched as needed. It is contemplated that the conflicts library can be an evolving database that updates solutions over time, as more and more mergeable metadata applications are integrated in a wide variety of target systems. The conflicts library may communicate with processes as well as contain a user interface, so that both automated conflict resolution and manual conflicts resolution are supported.

Figure 5:
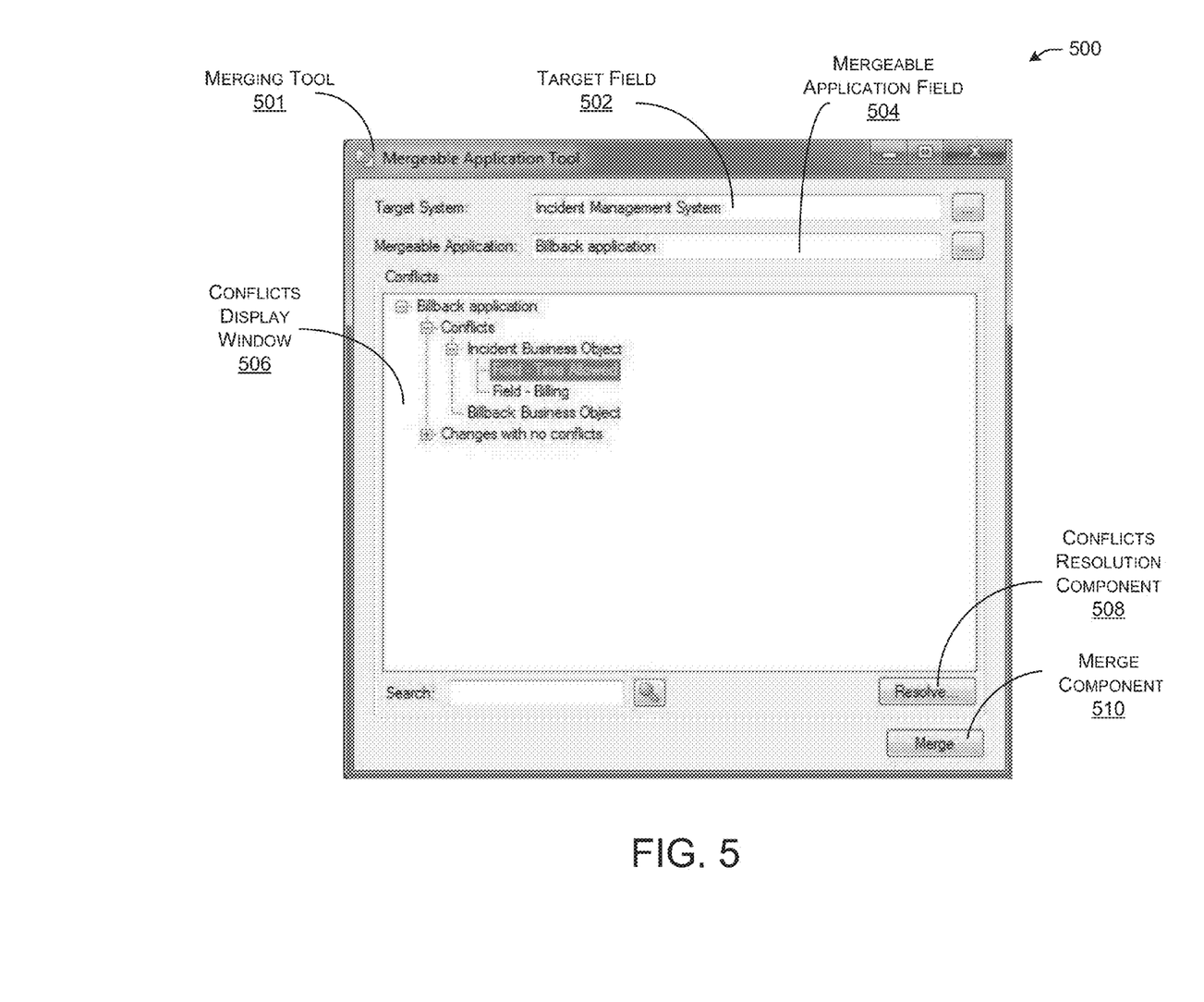
FIG. 5 is a block diagram of a user interface for mergeable metadata-based applications according to one or more example embodiments of the disclosure.

FIG. 5 shows an exemplary user interface 500 for a user of a target computer 122 (e.g., a system administrator). The user interface 500 may be associated with a merging tool 501 that facilitates the merging of one or more changes (included in a mergeable metadata application) with a target application executing on the target computer 122. As such, the user interface 500 may include a target field 502, in which the user may be able select a target computer 122 and/or a target application in which to merge changes.

Additionally, the user interface 500 may include a mergeable application field 504, in which the user may be able to select a mergeable metadata application from which to apply the changes. The user interface 500 may also include a conflicts display window 506, which may indicate one or more conflicts between the mergeable metadata application (e.g., specified in the mergeable application field 504) and the target application (e.g., specified in the target field 502). Furthermore, the user interface 500 may include a conflicts resolution component 508 and a merge component 510. The conflicts resolution component 508 may be any selectable component (e.g., a button, radial, etc.) that enables the user to make a selection for resolving conflicts (and/or any portions thereof) presented in the conflicts display window 506. The merge component 510 may be any selectable component (e.g., button, radial, etc.) that enables the user to make a selection for merging changes (and/or any portion thereof) included in the mergeable metadata application to the target application.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method of merging functionality of multiple applications, comprising: determining, by a computer comprising one or more processors, a change to be made to one or more operating conditions associated with an application on a target computer; identifying metadata associated with the application, the metadata corresponding to the change to be made to the one or more operating conditions associated with the application; generating a tag associated with the metadata, the tag comprising information that describes one or more database definitions included in the metadata and at least one connection point associated with the application, wherein the at least one connection point includes information about a physical component of the target computer, and wherein generating the tag comprises determining a dependency between two or more database objects associated with the metadata for inclusion in the information, wherein the dependency is not included in the information; wrapping the tag and the metadata into one or more mergeable metadata applications; and transmitting, to the target computer, the one or more mergeable metadata applications along with one or more database object stubs, the database object stubs including information for matching database constructs and less information than a fully realized database object, wherein the target computer performs operations comprising: identifying a digital signature associated with a first change comprised in the change to be made; identifying, based on the digital signature, a first mergeable metadata application that originally effected the change; comparing one or more database definitions of the first mergeable metadata application and the one or more database object stubs to the one or more operating conditions associated with the target application; and determining, based at least in part on the comparison, one or more conflict resolution changes to be made to the target application.

2. The method of claim 1, wherein the one or more database definitions comprise one or more new database definitions to be used by the application.

3. The method of claim 1, wherein the at least one tag comprises information describing one or more modifications to existing database definitions used by the application.

4. The method of claim 1, wherein transmitting the mergeable metadata application further comprises: serializing the mergeable metadata application into a transportable format.

5. The method of claim 1, wherein the at least one tag further comprises information describing respective dependencies between one or more database objects associated with the application.

6. The method of claim 1, further comprising associating the one or more changes with one or more digital signatures.

7. A method of merging functionality of multiple applications, comprising: receiving, by a target computer comprising one or more processors, one or more mergeable metadata applications along with one or more database object stubs, the database object stubs including information for matching database constructs and less information than a fully realized database object, the target computer executing a target application; extracting metadata and at least one tag from the one or more mergeable metadata applications, the at least one tag comprising description information that describes one or more database definitions included in the metadata and at least one connection point associated with the target application, wherein the at least one connection point includes information about a physical component of the target computer, and wherein extracting the metadata and the at least one tag comprises determining one or more dependencies between two or more database objects associated with the metadata for inclusion in the information, wherein at least one dependency of the one or more dependencies is not included in the information; identifying, based at least in part on the description information and one or more operating conditions associated with the target application, one or more conflicts between the one or more mergeable metadata applications and the target application; identifying a digital signature associated with a first conflict comprised in the one or more conflicts; identifying, based on the digital signature, a first metadata application that originally effected the first conflict; comparing one or more database definitions of the first mergeable metadata application and the one or more database object stubs to the one or more operating conditions associated with the target application; and determining, based at least in part on the comparison, one or more conflict resolution changes to be made to the target application.

8. The method of claim 7, further comprising: merging the one or more database definitions with the target application.

9. The method of claim 8, further comprising:
receiving an indication to remove, from the target application one or more merged changes associated with the mergeable metadata application;
identifying the one or more merged changes based at least in part on a digital signature associated with the mergeable metadata application and the merged changes; and
removing the one or more merged changes from the target application.

10. The method of claim 7, further comprising: merging the one or more conflict resolution changes into the target application.

11. The method of claim 7, wherein the one or more conflict resolution changes comprise one or more modifications to database definitions associated with the target application.

12. The method of claim 7, wherein the one or more conflict resolution changes comprise one or more new database definitions to be added to the target application.

13. The method of claim 7, wherein the one or more conflict resolution changes comprises one or more user interface changes to a user interface associated with the target application.

14. A target computer, comprising:
at least one processor:
at least one memory storing computer-executable instructions, that when executed by the at least one processor, cause the at least one processor to:
execute a target application;
receive one or more mergeable metadata applications along with one or more database object stubs, the database object stubs including information for matching database constructs and less information than a fully realized database object;
extract metadata and at least one tag from the one or more mergeable metadata applications, the at least one tag comprising description information that describes one or more database definitions included in the metadata and at least one connection point associated with the target application, wherein the at least one connection point includes information about a physical component of the target computer, and wherein extracting the metadata and the at least one tag comprises determining one or more dependencies between two or more database objects associated with the metadata for inclusion in the information, wherein at least one dependency of the one or more dependencies is not included in the information;
identify, based at least in part on the description information and one or more operating conditions associated with the target application, one or more conflicts between the one or more mergeable metadata applications and the target application;
identify a digital signature associated with a first conflict comprised in the one or more conflicts;
identify, based on the digital signature, a first metadata application that originally effected the first conflict;
compare one or more database definitions of the first mergeable metadata application and the one or more database object stubs to the one or more operating conditions associated with the target application; and
determine, based at least in part on the comparison, one or more conflict resolution changes to be made to the target application.

15. The target computer of claim 14, wherein the computer-executable instructions further cause the at least one processor to: merge the one or more database definitions with the target application.

16. The target computer of claim 15, wherein the computer-executable instructions further cause the at least one processor to:
receive an indication to remove, from the target application, one or more merged changes associated with the mergeable metadata application;
identify the one or more merged changes based at least in part on a digital signature associated with the mergeable metadata application and the merged changes; and
remove the one or more merged changes from the target application.

17. The target computer of claim 14, wherein the computer-executable instructions further cause the at least one processor to: merge the one or more conflict resolution changes into the target application.

18. The target computer of claim 14, wherein the one or more conflict resolution changes comprise one or more modifications to database definitions associated with the target application.

19. The target computer of claim 14, wherein the one or more conflict resolution changes comprise one or more new database definitions to be added to the target application.

20. The target computer of claim 14, wherein the one or more conflict resolution changes comprises one or more user interface changes to a user interface associated with the target application.

* * * * *

UNITED STATES PATENT AND TRADEMARK OFFICE
CERTIFICATE OF CORRECTION

Page 1 of 1

PATENT NO. : 9,612,825 B2
APPLICATION NO. : 14/213994
DATED : April 4, 2017
INVENTOR(S) : Arlen Sander Feldman and Vance Franklin Brown It is certified that error appears in the above-identified patent and that said Letters Patent is hereby corrected as shown below:

On the Title Page

Assignee (Item (73)), please change "Wells Fargo Bank, National Association, As Agent, Santa Monica, CA (US)" to -- Cherwell Software, LLC, 12295 Oracle Boulevard, Colorado Springs, CO 80921 --

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*